US009695941B2

(12) United States Patent
Fichtner et al.

(10) Patent No.: US 9,695,941 B2
(45) Date of Patent: Jul. 4, 2017

(54) SLIDING RING SEAL WITH CONVEYING SLEEVE

(71) Applicant: EagleBurgmann Germany GmbH & Co. KG, Wolfratshausen (DE)

(72) Inventors: Joseph Fichtner, Wolfratshausen (DE); Stefan Ledig, Wolfratshausen (DE); Joachim Skrzidlo, Wolfratshausen (DE); Rudolf Kollinger, Konigsdorf (DE); Thomas Bohm, Zell (DE); Daniel Frohlich, Geretsried (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 15/114,482

(22) PCT Filed: Feb. 12, 2015

(86) PCT No.: PCT/EP2015/052933
§ 371 (c)(1),
(2) Date: Jul. 27, 2016

(87) PCT Pub. No.: WO2015/128196
PCT Pub. Date: Sep. 3, 2015

(65) Prior Publication Data
US 2016/0356383 A1 Dec. 8, 2016

(30) Foreign Application Priority Data
Feb. 25, 2014 (DE) .................. 10 2014 203 336

(51) Int. Cl.
*F16J 15/34* (2006.01)
(52) U.S. Cl.
CPC .................. *F16J 15/3404* (2013.01)

(58) Field of Classification Search
CPC .................. F16J 15/34; F16J 15/3404
See application file for complete search history.

(56) References Cited

U.S. PATENT DOCUMENTS

2008/0217861 A1    9/2008  Sei
2014/0175747 A1*   6/2014  Portenlanger ............ F16J 15/34
                                                          277/306

FOREIGN PATENT DOCUMENTS

CH            560341 A5      3/1975
DE     102011111697 A1       2/2013
(Continued)

OTHER PUBLICATIONS

International Search Report issued Sep. 3, 2015 in connection with priority application No. PCT/EP2015/052933.
(Continued)

*Primary Examiner* — Gilbert Lee
(74) *Attorney, Agent, or Firm* — Locke Lord LLP; Scott D. Wofsy

(57) ABSTRACT

The present invention relates to a mechanical seal arrangement, comprising a rotating slide ring and a stationary slide ring, which define a sealing gap between them, and a delivery device for delivering a fluid, wherein the delivery device comprises a sleeve-like basic body with first through-openings and second through-openings, wherein the delivery device rotates jointly with the rotating slide ring, wherein the first through-openings each have a first entry region on an outer periphery of the sleeve-like basic body and a first exit region on an inner periphery of the sleeve-like basic body, and wherein the second through-openings each have a second entry region on the inner periphery of the sleeve-like basic body and a second exit region on the outer periphery of the sleeve-like basic body.

11 Claims, 2 Drawing Sheets

(56) References Cited

FOREIGN PATENT DOCUMENTS

Figure 1:
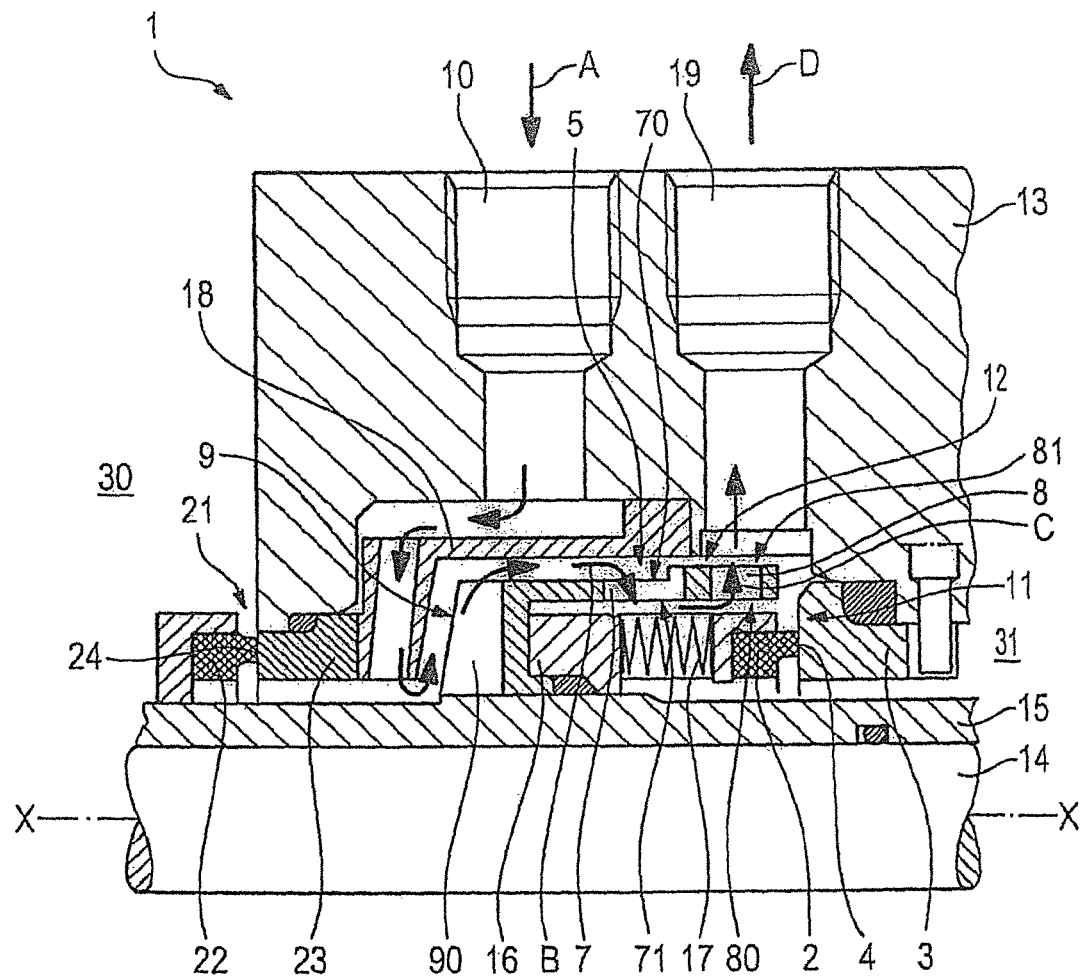

DE       102011118294 B3    4/2013
DE       102011122543 A1    6/2013
WO      WO-2013047658 A1    4/2013

OTHER PUBLICATIONS

Search Report in connection with priority application No. DE102014203336.5.
Written Opinion issued Sep. 3, 2015 in connection with priority application No. PCT/EP2015/052933.

* cited by examiner

SLIDING RING SEAL WITH CONVEYING SLEEVE

The present invention relates to a mechanical seal arrangement having a rotating delivery device for improved cooling of a mechanical seal.

Mechanical seal arrangements are known in various forms from the prior art. A problem area for such mechanical seals is frequently that relatively high temperatures can occur during operation. In order to avoid damage to the mechanical seal, this heat must therefore be discharged. In this connection, it is known to discharge such heat e.g. by means of a separate supply medium. In order to circulate such supply media, an external pump is usually used. Furthermore, so-called pump rings can also be used, for instance, but these can usually provide only a low level of delivery performance and can therefore also only ensure a low level of heat discharge. Furthermore, from DE 10 2011 118 294 A1, the use of a Tesla pump for circulation of a supply medium is known. This Tesla pump has proved itself at a basic level but it would be desirable to have other, particularly smaller alternatives.

It is therefore the object of the present invention to provide a mechanical seal arrangement which, while being of a simple construction and inexpensive to produce, takes up only a small installation space but can still provide a high level of delivery performance.

This object is achieved by a mechanical seal arrangement having the features of claim 1, the dependent claims present preferred developments of the invention.

The mechanical seal arrangement in accordance with the invention, having the features of claim 1, has the advantage that a high level of delivery performance can be provided, wherein the delivery device in accordance with the invention takes up only a small installation space. In this connection, the delivery device in accordance with the invention takes up only a small installation space in the axial direction and also in the radial direction. This is achieved in accordance with the invention in that the delivery device has a sleeve-like basic body with first through-openings and second through-openings. The delivery device rotates jointly with the rotating slide ring and comprises a fluid path through the delivery device itself, which path extends from the outside inwards and then from the inside outwards. This is achieved in accordance with the invention in that first and second through-openings are provided in the sleeve-like basic body. In this connection, the first through-openings have a first entry region on an outer side of the sleeve-like basic body and a first exit region on the inner periphery of the sleeve-like basic body. Conversely, the second through-openings have a second entry region on the inner periphery of the sleeve-like basic body and a second exit region on the outer periphery of the sleeve-like basic body. Therefore, the fluid which is used for cooling purposes can flow from an outer side of the sleeve-like basic body through the first through-openings in an inner region and flow from the inner region through the second through-openings to an outer region of the sleeve-like basic body. The delivery device in accordance with the invention is formed in an extremely robust manner and can also be produced relatively inexpensively. By the diversion of the fluid on the delivery device, heat can therefore be discharged in a targeted manner at very hot regions of the mechanical seal arrangement. By reason of its sleeve-like construction, the delivery device in accordance with the invention can thus be disposed directly over a heat source and discharge heat in a targeted manner. In particular, the delivery device channels the fluid into the proximity of the sealing gap between the rotating and the stationary slide ring of the mechanical seal arrangement.

The first through-openings preferably have a different geometrical form to the second through-openings. In this way, in particular, improved flow through the sleeve-like basic body of the delivery device can be achieved and, by intensified turbulence of the fluid, an improved cooling effect can be achieved.

In a particularly preferred manner, the first through-openings are formed as elongate apertures. Also in a preferred manner, the elongate apertures extend in the peripheral direction of the sleeve-like basic body. Up to four elongate apertures are preferably provided in the peripheral direction of the sleeve-like basic body.

Also in a preferred manner, the second through-openings in the sleeve-like basic body are provided in the form of cylindrical bores. In a particularly preferred manner, the cylindrical bores are disposed at uniform distances along a peripheral line on the sleeve-like basic body. Also in a preferred manner, a diameter of the sleeve-like bores is always larger than a minimum distance between two neighbouring bores.

In accordance with a further preferred embodiment of the present invention, the delivery device comprises an additional pump stage at an axial end of the sleeve-like basic body. The sleeve-like basic body preferably comprises a radially inwardly directed flange region on which the additional pump stage is disposed. The additional pump stage preferably comprises a large number of blades or lugs which provide the pumping effect. The delivery performance of the delivery device in accordance with the invention can be further increased by the provision of the additional pump stage.

Also in a preferred manner, the mechanical seal arrangement in accordance with the invention comprises a discharge channel, wherein the second through-openings of the sleeve-like basic body lie in the radial direction below the discharge channel. The second through-openings preferably lie completely in the radial direction below the discharge channel. In this way, rapid discharge of the medium from the mechanical seal arrangement can be effected and therefore a rapid discharge of heat can be rendered possible.

In accordance with a further preferred embodiment of the present invention, the second through-openings lie in the radial direction over the slide rings and in particular over the sealing gap between the rotating and the stationary slide ring. In this way, a particularly good discharge of heat in this region of the mechanical seal arrangement can be ensured, this region usually having the highest temperatures.

In accordance with a further preferred embodiment of the present invention, the sleeve-like basic body comprises a first portion with a first outer diameter and a second portion with a second outer diameter, wherein the first outer diameter is smaller than the second outer diameter. The first through-openings on the sleeve-like basic body are thus disposed in such a manner that they are formed in both the first and also in the second portion. In this way, an inflow edge in the region of the first through-openings is produced, whereby improved throughflow of the sleeve-like basic body is achieved. Furthermore, a throttling effect on the larger outer diameter can be achieved by the provision of a second portion with a larger outer diameter in conjunction with a housing component, so that a main flow of the fluid used for cooling through the first through-openings is ensured.

Also in a preferred manner, the second through-openings are formed entirely within the second portion with a larger diameter.

Also in a preferred manner, the mechanical seal arrangement comprises a housing which forms a gap with an outer periphery of the sleeve-like basic body. A cross-section of the gap is thus equal to or smaller than a cross-section of all the first through-openings and equal to or smaller than a cross-section of all the second through-openings. In this way, it is ensured that a sufficient quantity of fluid takes the fluid path through the sleeve-like basic body and therefore an optimal cooling effect is achieved.

Figure 2:
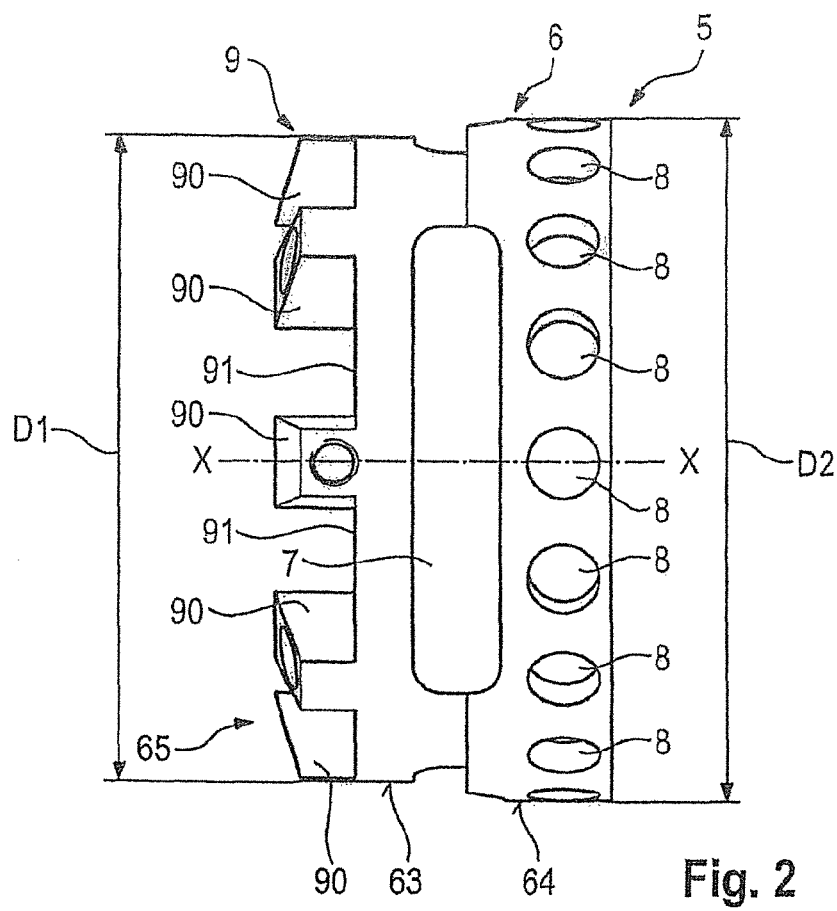
Figure 3:
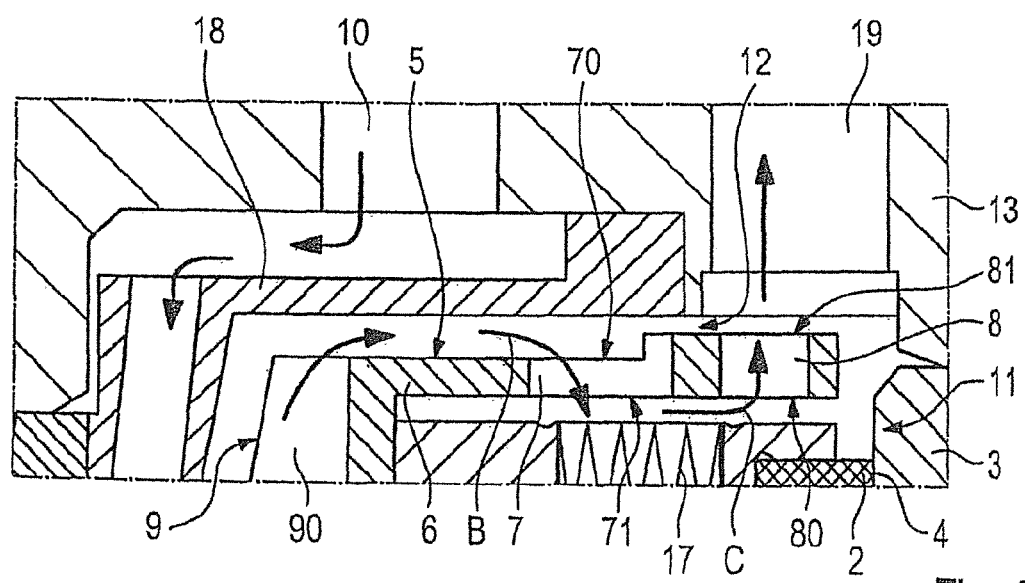

A preferred exemplified embodiment of the invention is described in detail hereinunder with reference to the accompanying drawing. In the drawing:

FIG. 1 is a schematic cross-sectional view of a mechanical seal arrangement in accordance with a preferred exemplified embodiment of the invention, FIG. 2 is a schematic side view of a delivery device shown in FIG. 1, and FIG. 3 is an enlarged schematic cross-sectional view of the mechanical seal arrangement of FIG. 1.

A mechanical seal arrangement 1 having a delivery device 5 in accordance with the invention is described hereinunder with reference to FIGS. 1 to 3.

As shown in FIG. 1, the mechanical seal arrangement 1 of this exemplified embodiment is formed as a dual-acting mechanical seal arrangement having a first mechanical seal 11 and a second mechanical seal 21. The mechanical seal arrangement 1 seals a product region 30 from an atmosphere region 31. The first mechanical seal 11 comprises a rotating slide ring 2 and a stationary slide ring 3, which define a sealing gap 4 between them. In the same way, the second mechanical seal 21 is formed with a rotating slide ring 22 and a stationary slide ring 23, which define a sealing gap 24 between them.

The delivery device 5 is disposed in the axial direction X-X and is attached to a shaft bushing 15 fixed to a shaft 14. A catch component 16 is likewise fixed to the shaft bushing 15 and connected via a bellows 17 to the rotating slide ring 2 of the first mechanical seal 11.

As also shown in FIG. 1, a supply medium, e.g. a pressurised blocking fluid, is supplied via a supply channel 10 and a fluid conveying device 18 to the mechanical seals 11, 21. The reference sign 19 designates a discharge channel. The supply channel 10 and the discharge channel 19 are formed in a housing 13 which is also connected to the stationary slide rings 3 and 23.

As shown in particular in FIG. 2, the delivery device 5 comprises a sleeve-like basic body 6. The sleeve-like basic body 6 comprises a large number of first through-openings 7 and a large number of second through-openings 8. The first through-openings 7 are provided as elongate apertures extending in the peripheral direction, wherein in this exemplified embodiment, precisely three first through-openings 7 are formed. The second through-openings 8 are formed as cylindrical bores. The first and second through-openings 7, 8 are thus each disposed on a peripheral line of the sleeve-like basic body 6.

FIG. 2 also shows that the sleeve-like basic body 6 has a first portion 63 with a first diameter D1 and a second portion 64 with a second diameter D2. The first diameter D1 is smaller than the second diameter D2. The second through-openings 8 are formed with a larger diameter D2 exclusively in the second portion 64. The first through-openings 7 are provided on the sleeve-like basic body 6 in such a manner that they are formed in both the first portion 63 and also in the second portion 64.

At an axial end 65 of the sleeve-like basic body 6 an additional pump stage 9 is also provided. The additional pump stage 9 comprises lugs 90 protruding in the axial direction X-X, wherein intermediate spaces 91 are provided between mutually adjoining lugs 90. The lugs 90 taper slightly in the radially outwards direction.

As also shown in particular in FIG. 3, the first through-opening 7 has a first entry region 70 which is provided on an outer periphery of the sleeve-like basic body 6. A first exit region 71 of the first through-openings 7 is provided on an inner periphery of the sleeve-like basic body 6. Furthermore, a second entry region 80 of the second through-openings 8 is formed on the inner periphery of the sleeve-like basic body 6 and a second exit region 81 of the second through-openings 8 is provided on the outer periphery of the sleeve-like basic body 6. In this way, a throughflow from the outside inwards and then from the inside outwards is achieved on the sleeve-like basic body 6.

The function of the mechanical seal arrangement 1 in accordance with the invention is as follows. A supply medium which is also used for cooling purposes is supplied via the supply channel 10, as indicated by the arrow A in FIG. 1. The blocking fluid flows through the fluid conveying device 18 to the outer periphery of the shaft bushing 15, as indicated in FIG. 1 by the small arrows. In operation, the shaft 14 rotates with the shaft bushing 15 so that the delivery device 5 also rotates with the rotating slide rings 2, 22. The delivery device 5 is connected by means of screws to the catch component 16 in the axial direction X-X and is connected by means of screws in the radial direction to the shaft bushing 15. By the rotation of the delivery device 5, the additional pump stage 9 develops a delivery effect so that the fluid is delivered to the outer periphery of the sleeve-like basic body 6.

Between the housing 13 and the outer periphery of the sleeve-like basic body 6, a throttling point 12 is formed so that the fluid flows from the outer periphery of the sleeve-like basic body 6 through the first through-openings 7 into an inner region in the sleeve-like basic body 6. This is indicated in FIG. 3 by the arrow B. From the inner region of the sleeve-like basic body 6 the fluid then flows radially outwards through the second through-openings 8, which is indicated in FIG. 3 by the arrow C.

The second exit regions 81 of the second through-openings 8 lie completely radially below the discharge channel 19. In this way, rapid and effective discharge of the fluid from the delivery device 5 is provided.

The fluid used for cooling therefore flows from an outer side of the delivery device 5 through the first through-opening 7 to an inner side and from the inner side through the second through-openings 8 back to the outer side of the delivery device 5. In this way, a forced diversion of the fluid is achieved by using only a single component, which furthermore also takes up only a very small installation space. In this way, the fluid used for cooling can be channelled directly to the most strongly heat-loaded components of the mechanical seal arrangement 1 and the heat can be effectively discharged from these components. The pumping effect can be further enhanced by the use of the additional pump stage 9 at the axial end 65 of the delivery device 5.

The delivery device 5 therefore comprises the first pump stage formed by the first and second through-openings 7, 8 and the second pump stage 9 provided at the axial end 65. As shown directly in FIGS. 1 and 3, the delivery device 5 in accordance with the invention is of a particularly compact construction. The construction is extremely small both in the axial direction X-X and also in the radial direction. In this way, a delivery device 5 can be disposed in the smallest installation space and effectively permits improved heat discharge at the mechanical seals. The various deflections and deliveries are achieved with only a single component, namely the delivery device 5. Therefore, a delivery device 5 which is inexpensive and relatively simple to produce can be provided, having significant advantages over the previously used delivery devices and permitting a clearly improved heat discharge. Furthermore, the delivery device in accordance with the invention is independent of the rotational direction and has an extremely broad range of usage.

LIST OF REFERENCE NUMERALS 1 mechanical seal arrangement
2 rotating slide ring
3 stationary slide ring
4 sealing gap
5 delivery device
6 sleeve-like basic body
7 first through-opening
8 second through-opening
9 additional pump stage on the delivery device
10 supply channel
11 first mechanical seal
12 throttling point
13 housing
14 shaft
15 shaft bushing
16 catch component
17 bellows
18 fluid conveying device
19 discharge channel
21 second mechanical seal
22 rotating slide ring
23 stationary slide ring
24 sealing gap
63 first portion
64 second portion
65 axial end
70 first entry region
71 first exit region
80 second entry region
81 second exit region
90 lugs/blades
91 intermediate spaces
X-X axial direction
A inflow
B/C flow through the sleeve-like basic body
D outflow
D1 first diameter
D2 second diameter

The invention claimed is:

1. Mechanical seal arrangement comprising:
a rotating slide ring and a stationary slide ring, which define a sealing gap between them,
a delivery device for delivering a fluid, wherein the delivery device has a sleeve-like basic body configured to provide a first pump stage through first through-openings and second through-openings, and an additional pump stage at an axial end of the sleeve-like basic body,
wherein the delivery device rotates jointly with the rotating slide ring,
wherein the first through-openings each have a first entry region on an outer periphery of the sleeve-like basic body and a first exit region on an inner periphery of the sleeve-like basic body, and
wherein the second through-openings each have a second entry region on the inner periphery of the sleeve-like basic body and a second exit region on the outer periphery of the sleeve-like basic body.

2. Mechanical seal arrangement as claimed in claim 1, wherein the first through-openings have a geometrical form different from the second through-openings.

3. Mechanical seal arrangement as claimed in claim 1, wherein the first through-openings are provided as elongate apertures.

4. Mechanical seal arrangement as claimed in claim 3, wherein the first through-openings extend in the peripheral direction of the sleeve-like basic body.

5. Mechanical seal arrangement as claimed in claim 1, wherein the second through-openings are provided as cylindrical bores.

6. Mechanical seal arrangement as claimed in claim 1, wherein the additional pump stage comprises lugs protruding in an axial direction.

7. Mechanical seal arrangement in claim 1, wherein the second through-openings are disposed in the radial direction below a discharge channel.

8. Mechanical seal arrangement as claimed in claim 1, wherein the second through-openings are disposed in the radial direction over the rotating slide ring.

9. Mechanical seal arrangement as claimed in claim 1, wherein the sleeve-like basic body has a first portion with a first outer diameter and a second portion with a second outer diameter, wherein the first outer diameter is smaller than the second outer diameter and wherein the first through-openings are formed in the first portion and also in the second portion.

10. Mechanical seal arrangement as claimed in claim 9, wherein the second through-openings are formed exclusively in the second portion.

11. Mechanical seal arrangement as claimed in claim 1, further comprising a housing, wherein a gap is formed between an outer periphery of the sleeve-like basic body and an inner periphery of the housing, this gap comprising a cross-sectional area which is equal to or smaller than a cross-sectional area of the first through-openings and equal to or smaller than a cross-sectional area of the second through-openings.

* * * * *